(No Model.) 8 Sheets—Sheet 2.

W. P. WHITMARSH.
MACHINE FOR FEEDING HORSESHOE NAIL BLANKS.

No. 573,560. Patented Dec. 22, 1896.

(No Model.) 8 Sheets—Sheet 3.

W. P. WHITMARSH.
MACHINE FOR FEEDING HORSESHOE NAIL BLANKS.

No. 573,560. Patented Dec. 22, 1896.

WITNESSES.

INVENTOR.
William P. Whitmarsh
by T. E. Teschemacher
Atty

(No Model.) 8 Sheets—Sheet 6.
W. P. WHITMARSH.
MACHINE FOR FEEDING HORSESHOE NAIL BLANKS.
No. 573,560. Patented Dec. 22, 1896.

WITNESSES.

INVENTOR.
William P. Whitmarsh

(No Model.) 8 Sheets—Sheet 7.
W. P. WHITMARSH.
MACHINE FOR FEEDING HORSESHOE NAIL BLANKS.
No. 573,560. Patented Dec. 22, 1896.

(No Model.) 8 Sheets—Sheet 8.

W. P. WHITMARSH.
MACHINE FOR FEEDING HORSESHOE NAIL BLANKS.

No. 573,560. Patented Dec. 22, 1896.

UNITED STATES PATENT OFFICE.

WILLIAM P. WHITMARSH, OF QUINCY, MASSACHUSETTS.

MACHINE FOR FEEDING HORSESHOE-NAIL BLANKS.

SPECIFICATION forming part of Letters Patent No. 573,560, dated December 22, 1896.

Application filed May 15, 1896. Serial No. 591,692. (No model.)

*To all whom it may concern:*

Be it known that I, WILLIAM P. WHITMARSH, a citizen of the United States, residing at Quincy, in the county of Norfolk and State of Massachusetts, have invented certain improvements in machines for feeding partially-finished horseshoe-nails or nail-blanks one by one from a mass thereof to other machinery for subsequently operating upon the same in such manner that the nails or nail-blanks will be presented to such machinery with a predetermined side always facing in one and the same direction, of which the following is a full, clear, and exact description, reference being had to the accompanying drawings, making part of this specification, in which—

My invention relates to an improved machine for feeding partially-finished horseshoe-nails or nail-blanks one by one from a mass or quantity thereof to other machinery for subsequently pointing or otherwise operating upon or finishing the same, so that the nails or nail-blanks will be invariably presented or delivered to such machinery with a predetermined side always facing in one and the same direction. To provide a machine of this character which will perform its work rapidly as well as accurately and effectively is the object of my invention, which consists in certain novel features, combinations of parts, and details of construction, as will be hereinafter set forth, and specifically pointed out in the claims.

In the said drawings, A represents the framework of the machine.

Figure 1:
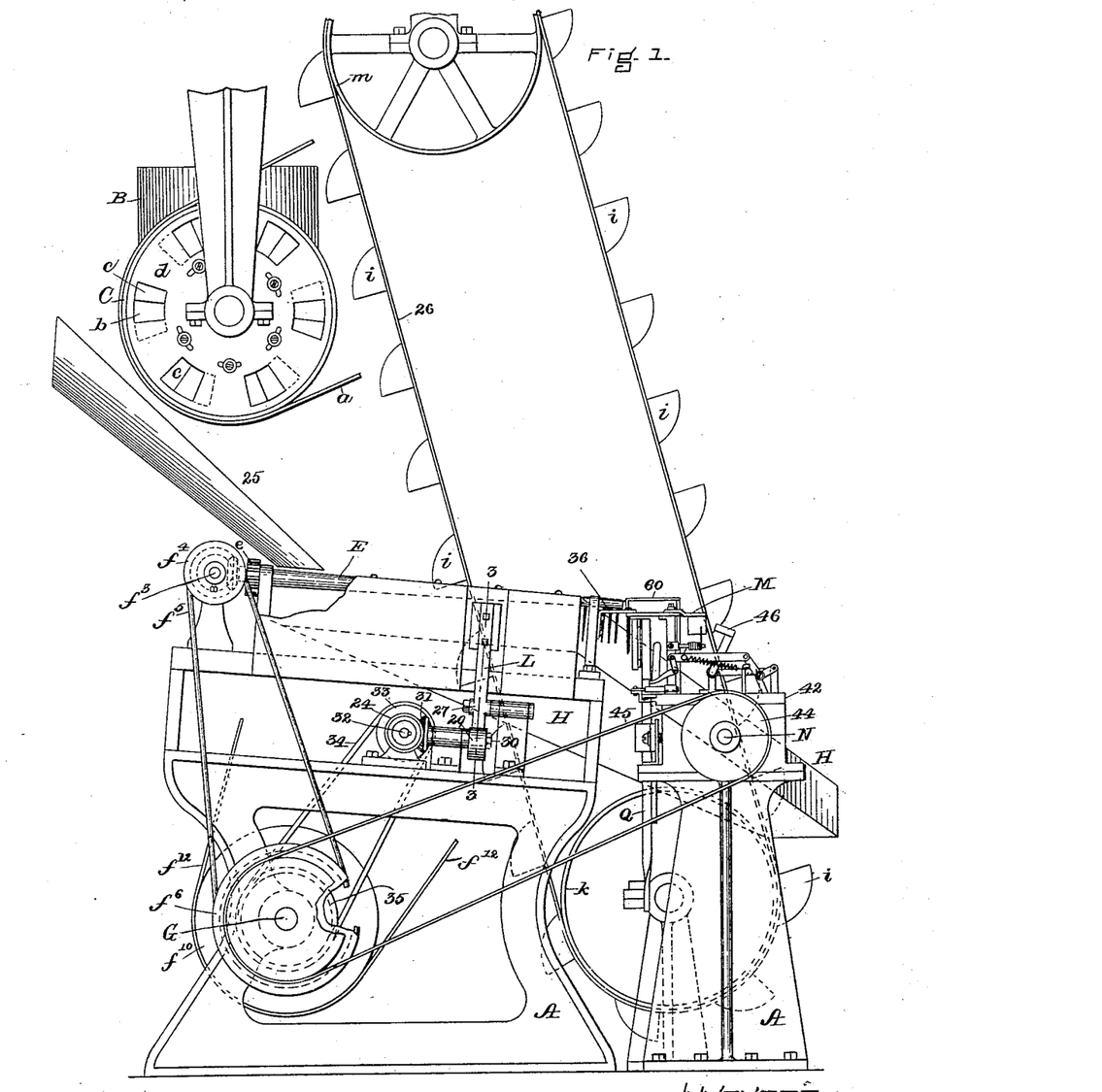
Figure 1 is a side elevation of my improved machine.
Figure 2:
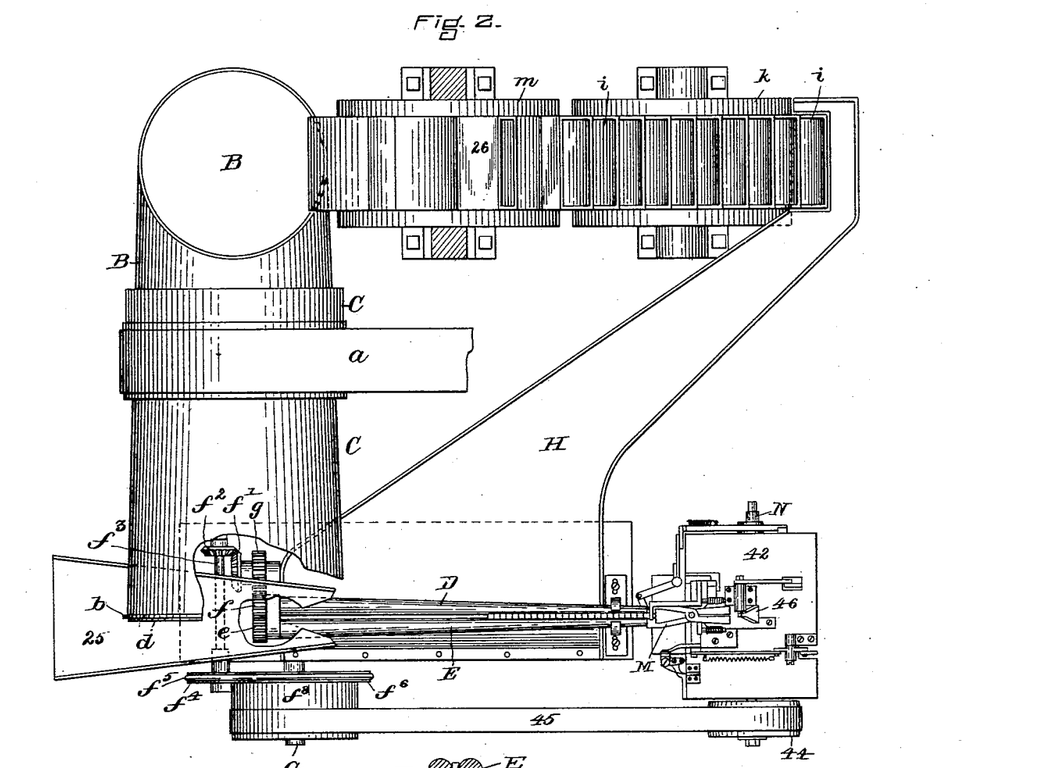
Fig. 2 is a plan of the same.
Figure 9:
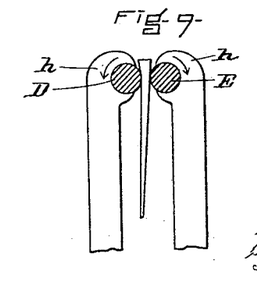
Fig. 9 is a sectional detail on the line 9 9 of Fig. 8.

B is a hopper for the reception of a quantity or mass of partially-finished nails or nail-blanks, which pass therefrom to a slowly-rotating cylinder C, actuated by a driving-belt $a$, Fig. 2, receiving motion from a suitable pulley on an overhead shaft, (not shown,) said cylinder being preferably slightly inclined and having a head $b$, Figs. 1 and 2, provided near its periphery with outlet-apertures $c$, which are made adjustable in size by means of a covering-disk $d$, having corresponding apertures and rotating on a center coinciding with the axis of the cylinder. Through these apertures $c$ the nails escape in small quantities as the cylinder revolves and drop into an open inclined chute 25, by which they are conducted to a raceway composed of a pair of tapering feed-rolls D E, which are arranged in an inclined position, as shown in Fig. 1, and at such distance apart as to leave a narrow space between them a little more than sufficient to accommodate the shanks of the nails when turned with their wider flat sides parallel with the rolls, the nails when between these rolls being supported by their heads and being fed forward in a pendent position by the rotation of the rolls, the direction of which is upward and outward from each other. The rolls D E are journaled at the larger ends in suitable supports, outside of which they are provided with gears $e\ f$, meshing with each other, the gear $f$ being engaged by another gear $g$, secured to a short shaft carrying a bevel-gear $f'$, meshing with a bevel-gear $f^2$ on a shaft $f^3$, the latter carrying a pulley $f^4$, receiving motion by means of a belt $f^5$ from a pulley on $f^6$ on the driving-shaft G of the machine, as shown in Figs. 1 and 2, said driving-shaft carrying a pulley $f^{10}$, over which passes a belt $f^{12}$, receiving motion from a pulley on the same overhead shaft (not shown) from which motion is communicated to the belt $a$, which drives the cylinder C. The lower ends of the rolls D E are supported in journal-boxes $h\ h$, open on the inner side, as shown in Fig. 9, thereby preventing any interruption of the space between said rolls which forms the passage for the nails.

As the nails drop from the chute 25 many of them fail to enter the space between the feed-rolls, and such nails drop into an open inclined chute H, by which they are delivered to elevator-buckets $i$, secured to an endless belt 26, passing over pulleys $k\ m$, as shown in Fig. 1, the nails taken up by these buckets being discharged into the hopper B to be again delivered to the feed-rolls, as before.

Figure 3:
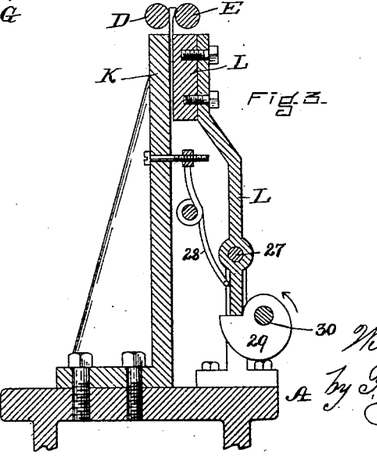
Fig. 3 is an enlarged vertical section on the line 3 3 of Fig. 1.

As nails are frequently found having crooked shanks, I provide a device for straightening the same before they pass out from the lower end of the raceway formed by the rolls D E. This device, which is shown in Figs. 1 and 3, and is located immediately beneath the rolls D E, about midway of their length, consists of a vertical bar or anvil K, rising from the framework, with which coöperates a hammer L, pivoted at 27, and actuated against the resistance of a spring 28 by a cam 29 on a shaft 30, the latter carrying a bevel-gear 31, meshing with a bevel-gear 24 on a shaft 32, which also carries a pulley 33, driven by a belt 34, receiving motion from a pulley 35 on the driving-shaft G. The hammer and anvil are of sufficient width to enable them to act on several nails at the same time, the shanks of which as they hang pendent between the rolls being thus subjected to the blows of the hammer, which thus serves to straighten any crooked nails which may happen to pass down the raceway.

Any "slugs" or articles other than nails which may be mixed with the mass in the hopper will on reaching the raceway fall off on either side of the same by reason of the upward and outward rotative movement of the rolls and the concussion produced by the blows of the hammer L.

Figures 4, 5:
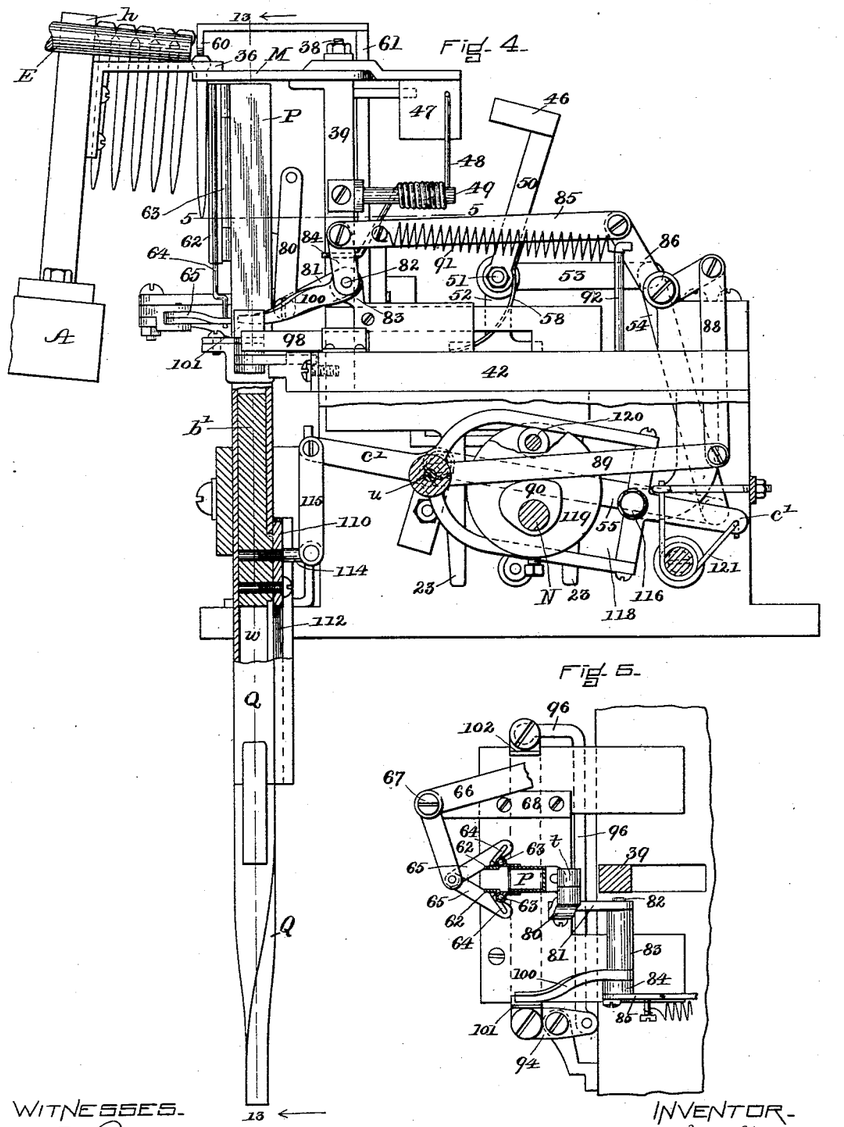
Fig. 4 is an enlarged sectional elevation of that portion of the machine which takes the nails from the feed-rolls and delivers the same to other machinery, one side of the frame and the driving-pulley being removed to show the parts behind the same.
Fig. 5 is a horizontal section on the line 5 5 of Fig. 4.
Figure 6:
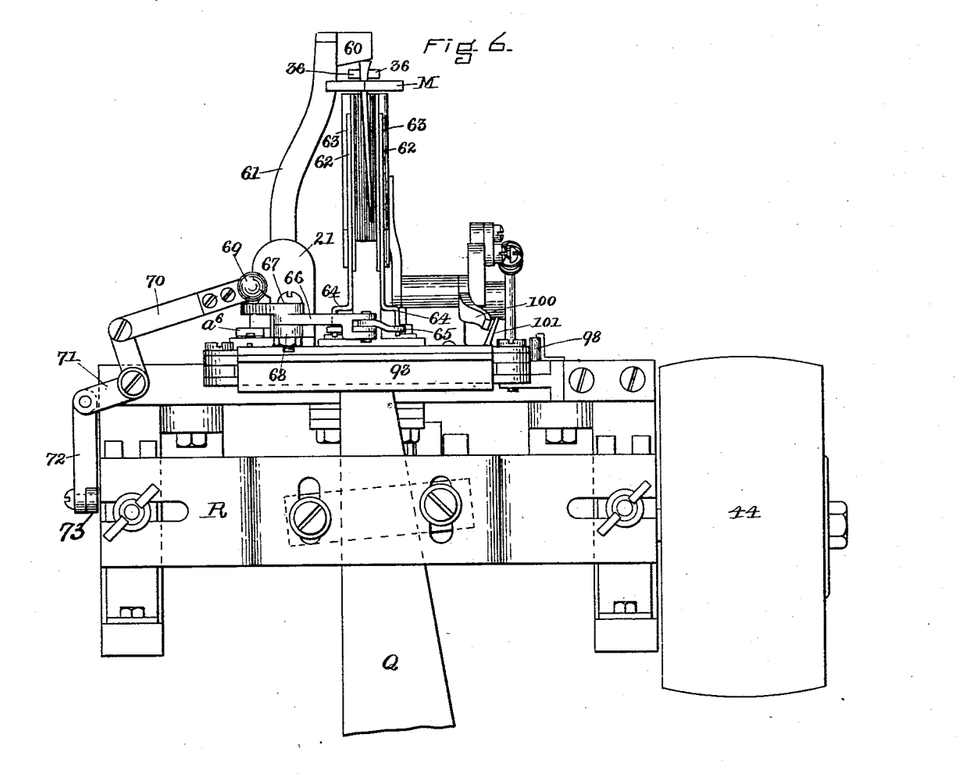
Fig. 6 is a front elevation of the parts shown in Fig. 4.
Figure 7:
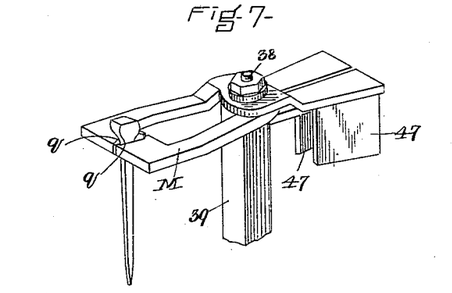
Fig. 7 is a perspective view of the nail-grippers.
Figure 10:
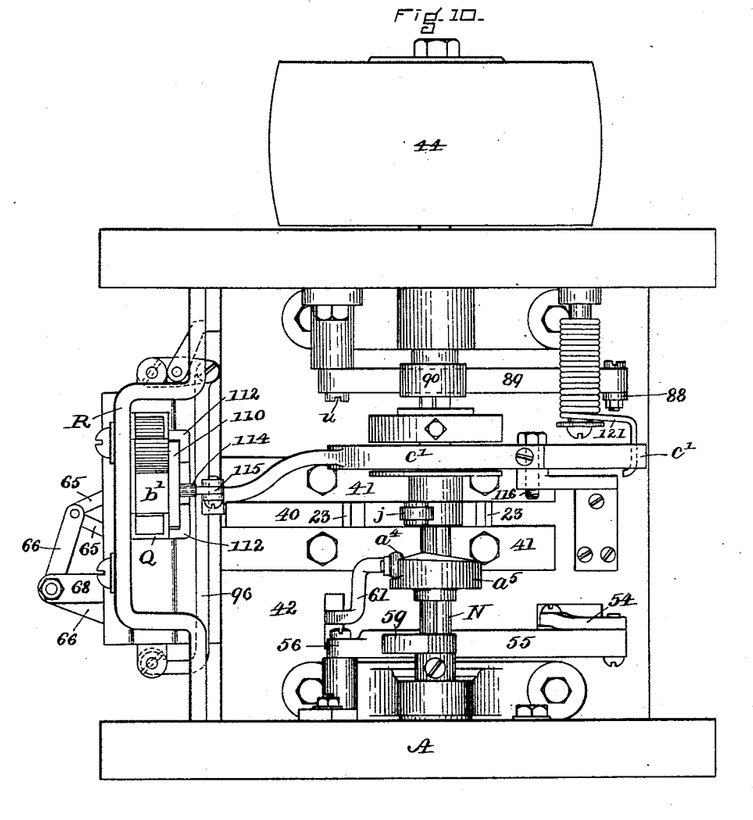
Fig. 10 is a plan of the under side of that portion of the machine shown in Fig. 4.
Figure 11:
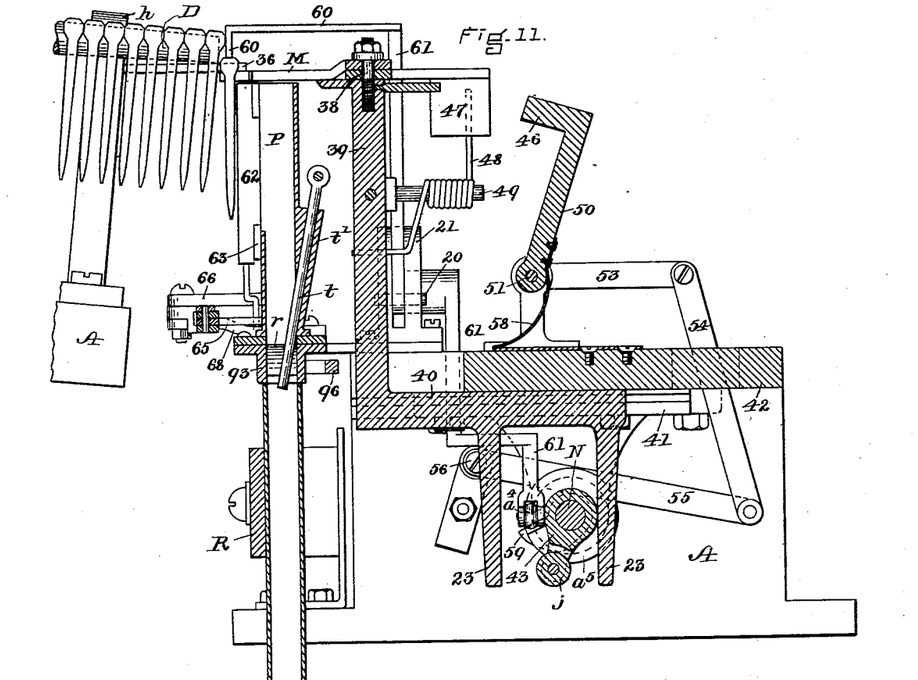
Fig. 11 is a vertical section on the line 11 11 of Fig. 8.

Each nail as it drops off the end of the raceway is caught by the head in a space or guideway between a pair of guide-plates 36, which hold the nail in a position to be seized immediately under its head by a carrier consisting of a pair of reciprocating grippers M, the two members of which are pivoted together upon a vertical stud 38, projecting from a post or standard 39, Figs. 4, 7, and 11, the jaws of the grippers being provided with notches $q$ to enable them to embrace the nail, as shown in Fig. 7. The standard 39 rises from a slide 40, moving in horizontal ways 41, secured to the under side of the bed 42, said slide 40 having two downwardly-projecting arms 23, which are acted upon alternately by a roll $j$ at the end of a crank 43, secured to a transverse shaft N, carrying outside the framework a pulley 44, driven by a belt 45 from a pulley $f^8$ on the driving-shaft G, and thus as the crank 43 is rotated the standard 39 is moved forward and back, causing the grippers to advance at the proper time to seize the nail and afterward recede and deposit it within a conductor P, to be hereinafter described. The grippers M are opened at the proper time to release the nail and held open until they have advanced into a position to seize the next nail by a wedge 46, which is forced between a pair of plates 47, projecting downward from their rear ends, springs 48 being arranged to bear against said plates 47, whereby the grippers are closed to seize the nail as soon as the wedge is withdrawn. The springs 48 are coiled around horizontal supporting-studs 49, projecting from the standard 39, the lower ends of the springs bearing against the said standard. The wedge 46 is secured to the upper end of an arm 50, secured to a short shaft 51, supported in a standard 52 and having secured to its opposite end a lever 53, to which is pivoted a pitman 54, pivoted at its lower end to a lever 55, fulcrumed at 56 and actuated against the resistance of a spring 58 by a cam 59 on the shaft N, as shown in Figs. 10 and 11. The rotation of the feed-rolls composing the raceway is properly timed, so that a nail will be delivered to the guideway in time to be seized by the grippers at each forward movement of the same. The line of nails in the raceway is held back by a stop-finger 60 at the end of a lever 61, pivoted at 20, Fig. 11, to an upright 21, said lever 61 passing down through an aperture in the bed 42 and carrying at its lower end a roll $a^4$, which is acted upon by a cam $a^5$ on the shaft N, whereby said lever is actuated against the resistance of a spring $a^6$, Figs. 6 and 8, said cam and spring producing the desired movements of the finger 61, which is swung into the position shown in Fig. 11 immediately over and in contact with the head of the foremost nail, as shown in Fig. 13, the instant after it has been seized by the grippers, which now recede to carry the shank of the pendent nail into the conductor P, within which it is dropped by the grippers as they are opened by the advance of the wedge 46, the forward motion of which is continued in order to hold the grippers open while they are advancing to take the next nail, and as soon as the grippers have reached the end of their forward movement the wedge 46 is suddenly withdrawn by the spring 58, when the grippers will be closed upon the nail by their springs 48, the cam 59 at that instant passing out of contact with the lever 55.

Figures 13, 15, 16, 17, 18:
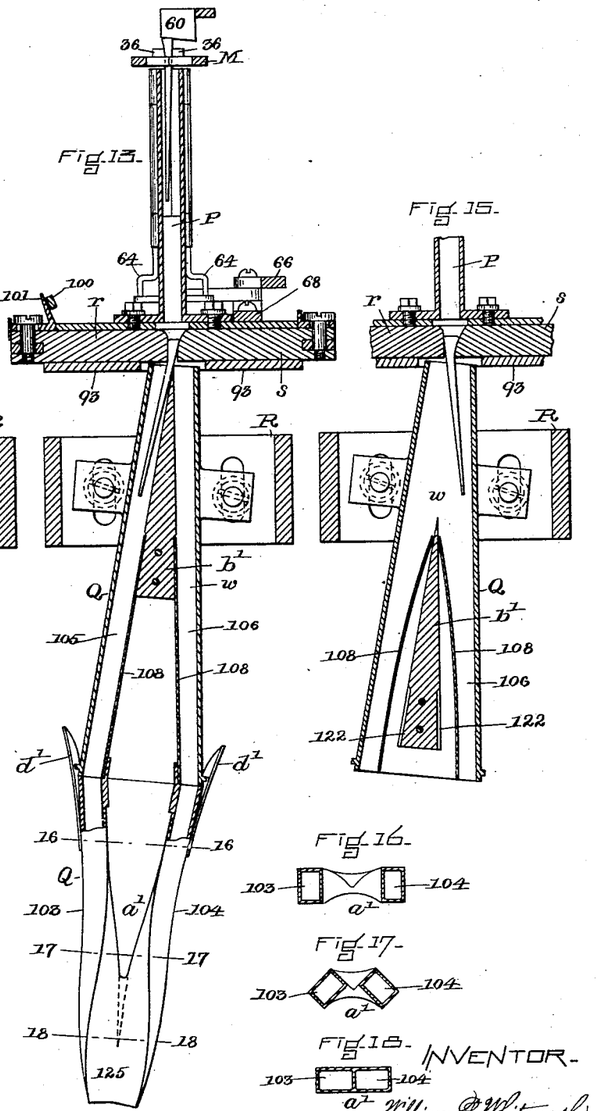
Fig. 13 is a vertical section on the line 13 13 of Fig. 4, looking outward in the direction of the arrow.
Figs. 14 and 15 are similar sections showing some of the parts in a different position.
Fig. 16 is a horizontal section on the line 16 16 of Fig. 13.
Fig. 17 is a horizontal section on the line 17 17 of Fig. 13.
Fig. 18 is a horizontal section on the line 18 18 of Fig. 13.

The stop-finger 60, lying directly over the head of the nail, as shown in Fig. 13, prevents it from rising up as it is carried through the guideway by the grippers, and as soon as the grippers commence to move forward the stop-finger 60 is withdrawn to allow the foremost nail in the raceway to drop off its end into the space between the guide-plates 36, the finger being again moved forward to intercept the next nail as soon as the nail between the guide-plates has been seized by the grippers.

Figure 8:
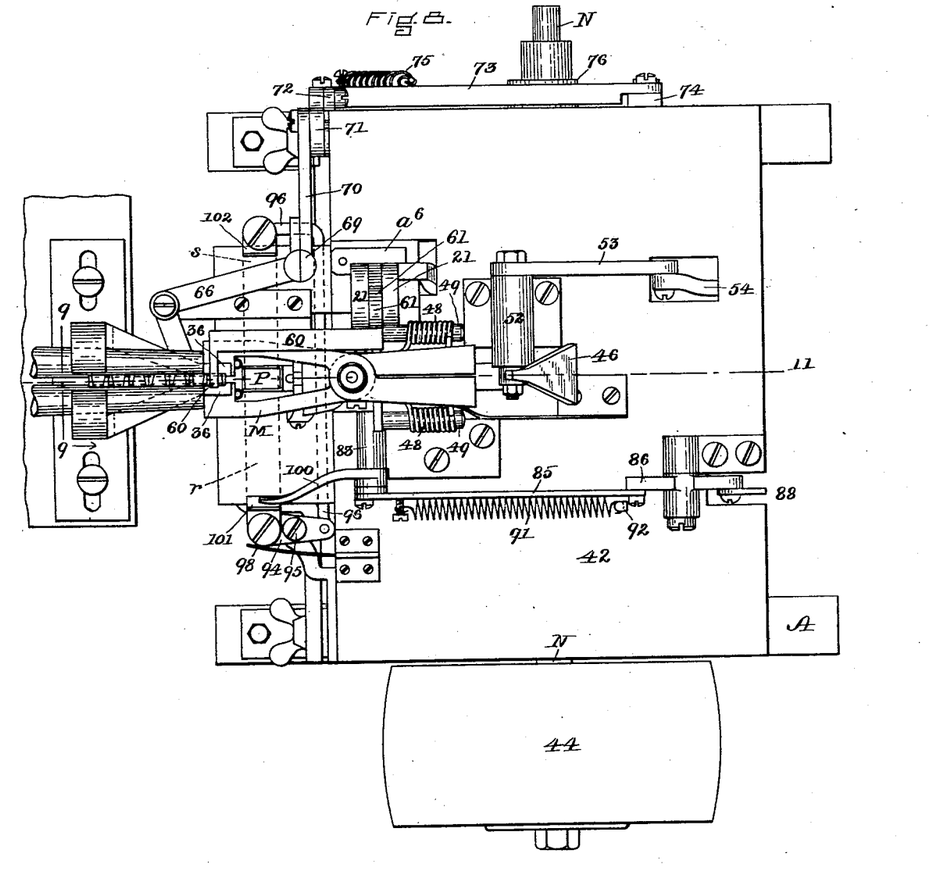
Fig. 8 is a plan of the parts shown in Fig. 4.
Figure 12:
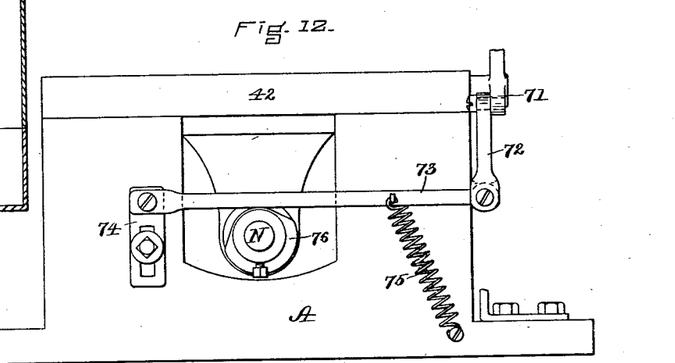
Fig. 12 is an elevation of a portion of the side of the machine opposite to that shown in Fig. 4.

The front of the conductor P is left open to permit of the entrance of the shank of the nail as it is carried back by the grippers, and this open portion is provided with a pair of laterally-swinging doors 62, hinged at 63 to the edges of the opening. These doors are provided at their lower ends with crank-arms 64, which are connected by a pair of loosely-pivoted diverging links 65 with a bell-crank lever 66, Figs. 5 and 6, pivoted at 67 to a stationary support 68. To the opposite end of the lever 66 is pivoted, by means of a universal joint 69, a connecting-rod 70, the opposite end of which is pivoted to a bell-crank lever 71, connected by a link 72 to a lever 73, Fig. 12, pivoted to a vertically-adjustable plate 74, said lever 73 being actuated against the resistance of a spring 75 by a cam 76 on the shaft N, whereby through the connections described the doors 62 are opened just before the grippers begin to recede and close as soon as the shank of the nail is within the conductor P and before it is dropped by the grippers, the nail being thus securely inclosed and guided in its passage through the conductor, which is of oblong shape in cross-section, whereby the nail is prevented from turning axially in its descent therethrough. If the shank of the nail should happen to be slightly inclined outward as it enters the open side of the conductor, the doors 62 in closing will carry the shank inward, thus insuring its being properly placed within said conductor. As the nail drops it is caught by the head and held in a pendent position between a pair of slides or dies $r\ s$, Figs. 13, 14, and 15, to be hereinafter described, and to prevent any possibility of the nail becoming obstructed or failing to reach its proper position between said dies a reciprocating pusher-rod or clearer $t$, Fig. 11, is employed, which slides in a suitable guideway $t'$ in the rear side of the conductor P, its lower end following the head of the nail and pushing it down if it should not reach its proper position by its own gravity. The rod $t$ remains stationary after the nail has been caught between the dies, and as the latter are separated the rod $t$ descends still farther, passing through between the dies to insure the instant dropping of the nail when its head is released by the opening or separation of the said dies. The clearer $t$ has pivoted to its upper end a connecting-rod 80, the opposite end of which is pivoted to an arm 81, secured to a short rocker-shaft 82, supported in a long bearing 83 and carrying at its opposite end an arm 84, to which is pivoted a connecting-rod 85, pivoted at its opposite end to one arm of a bell-crank lever 86, the opposite arm of which is connected by a rod 88 to a lever 89, fulcrumed at $u$ and actuated in one direction by a cam 90 on the shaft N, the parts being actuated in the opposite direction by a spring 91, secured at one end to the rod 85 and at the other end to a standard 92, rising from the bed 42, as shown in Figs. 4 and 8. The cam 90 is properly shaped to cause the pusher-rod $t$ to descend a certain distance, then remain stationary for a short time, and subsequently make a further descent to push the nail through the dies in case it should stick and fail to drop the instant the dies are separated.

Figure 14:
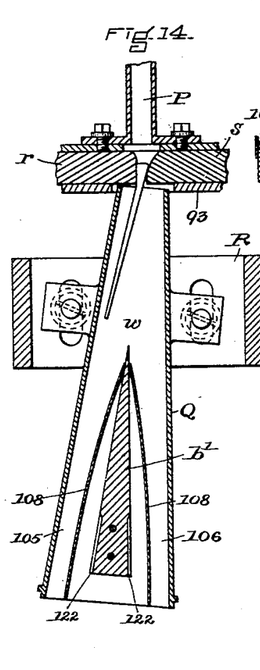

I will now describe the means employed to insure the nails being delivered from the machine with a predetermined side always facing in the same direction, as is necessary to insure their correct delivery to other machinery requiring the nails to be always fed thereto invariably in one position. The nails pass down the roller-raceway with the straight flat side or back facing either to the right or to the left and are carried in by the grippers M and dropped through the conductor P in one of these two positions, where, as before stated, they are caught by the head between the dies $r\ s$, which have been brought into the position shown in Figs. 13, 14, and 15 previous to the release of the nail. These dies, which are arranged directly beneath the conductor P, have their inner ends or faces differently shaped, the die $r$ having a nearly straight vertical face and the die $s$ having a curved face, the peculiar shape of these faces determining the position or inclination to the right or left of the shank of the nail when suspended by the head between said dies. In Figs. 13 and 14 the shank is shown as inclined to the left by reason of the inclined or beveled front side of the head fitting snugly against the nearly straight vertical face of the die $r$, the nail having been dropped through the conductor with its straight side or back facing to the right. In Fig. 15 the shank of the nail is shown as inclined to the right by reason of the beveled side of the head fitting closely against the curved face of the die $s$, the nail having been dropped through the conductor with its straight side facing to the left. The nails are thus always held by the dies in one of these two positions ready when released to drop through a delivery tube or conduit Q, arranged immediately beneath the dies and adjustably secured by means of slotted ears and screws to a support R, the latter being adjustably secured to the framework by slots and thumb-screws, as shown in Fig. 6. The dies $r\ s$ slide within horizontal ways 93, and are connected together in such manner that they will move simultaneously in opposite directions by means of a lever 94, centrally fulcrumed at 95 and pivoted at one end to the die $r$, the opposite end of this lever being pivoted to a connecting-rod 96, the opposite end of which is bent at a right angle and pivoted to the outer end of the die $s$, as shown in Figs. 5 and 8. The dies $r\ s$ thus coupled together are moved away from each other against the resistance of a spring 98, bearing against the die $r$, to release the nail suspended between said dies, by a rocker-arm 100, secured to the same rock-shaft 82 that operates the clearer-rod $t$, previously described. This arm 100, when nearly at the end of its downward movement, is brought into contact with an inclined projection 101, rising from the outer end of the die $r$, which is thus moved outward as the arm descends, the other die $s$, being simultaneously moved in the opposite direction through the medium of the lever 94 and rod 96, thus releasing the nail, which then drops into the upper end of the tube Q, immediately after which the arm 100 is raised out of contact with the projection 101, when the spring 98 will instantly return the dies to their normal position ready to catch the succeeding nail when released by the grippers M. The projection 101 is made adjustable on the die $r$ and acts as a stop to limit its inward movement, and the die $s$ is provided with an adjustable stop 102, which acts in a similar manner to limit the inward movement of the die $s$, and by adjusting these stops the normal distance of the inner ends of the dies from each other can be nicely regulated in accordance with the size of the nails being passed through the machine.

The delivery tube or conduit Q is composed of an upper portion $w$, Figs. 13, 14, and 15, of gradually-increasing width from top to bottom, and a lower portion $a'$, removably secured to the upper portion $w$ by spring-catches $d'$, as shown in Fig. 13, and having two diverging branches 103 104, which coincide at their upper ends with two separate passages 105 106, formed within the portion $w$ by two spring-partitions 108, the upper ends of which are free to assume the two positions shown in Figs. 13 and 14. Between these two spring-partitions is placed a long wedge-shaped slide or partition $b'$, to the inner side of which is secured a guide-plate 110, Fig. 4, which moves in vertical ways 112 on the inner side of the portion $w$, and from the inner side of this wedge projects a stud 114, which is connected by a link 115 with a lever $c'$, fulcrumed at 116 and having an open portion 118, within which works an eccentric 119, secured to the shaft N, said eccentric being provided with an antifriction-roll 120, which acts on the under side of the opening in the lever to depress the same, and with it the wedge-shaped slide $b'$, against the resistance of a spring 121, secured to the end of the short arm of the lever $c'$, as shown in Fig. 4, said spring serving to raise the lever with a quick movement as soon as the roll 120 has passed out of contact with the lower side of the opening in the lever $c'$. This upward movement of the lever $c'$ and slide $b'$ takes place soon after the nail has dropped into its place between the dies $r$ $s$, and as the wedge-shaped slide $b'$ is raised to the upper end of the tube Q, as shown in Fig. 13, the shank of the nail will lie on one side or the other of the same according as it is inclined to the right or the left while suspended by the head between the dies $r$ $s$. Consequently if the nail is inclined to the left, as shown in Figs. 13 and 14, it will when released drop down through the passage 105, while if the nail is inclined in the opposite direction, as in Fig. 15, it will pass down the passage 106. The slide $b'$, as it is raised, passes up between the yielding upper ends of the springs 108, separating the same, as shown in Fig. 13, and at the lower end of this slide on opposite sides of the same are shallow recesses 122, forming shoulders against which the upper ends of the springs 108 fit, whereby they are caused to lie flush with the sides of the slide $b'$, leaving no projecting edges to interfere with or obstruct the nail in its descent. When the slide $b'$ is at the lowest point of its traverse, as shown in Figs. 14 and 15, it lies beneath the point of the nail held suspended between the dies $r$ $s$, thereby leaving a clear space at the top of the conduit, so that the nail dropping into the space between said dies may be free before the ascent of the slide to swing to the right or left, according to its axial position with respect to the faces of the dies.

The passages 105 106 and branches 103 104 of the tube Q are of oblong form in cross-section to correspond approximately to the shape in cross-section of the head of a nail, the narrow sides of the passages being of less width than the wide flat sides of the nail, whereby the nail in its descent is compelled to keep its position with its wider flat sides substantially parallel with the corresponding wider sides of said passages and branches through which they pass.

The two branches 103 104 of the lower portion $a'$ of the tube Q are twisted axially a quarter-revolution, respectively, in opposite directions, these two branches terminating in a wider flattened delivery end or portion 125, from which the nails are delivered to other machinery, by which they are subsequently finished or otherwise operated upon, said end 125 being of such shape as to prevent axial movement of the nail after passing into it from either of the branches 103 104. By this construction it will be obvious that when a nail pendent between the dies $r$ $s$, with its shank inclined to the left, as shown in Figs. 13 and 14, is dropped through the upper passage 105 of the conduit Q it will in passing through the twisted branch 103 be turned axially a quarter-revolution to the left, passing out of the delivery end 125 of the conduit with its straight flat side or back facing toward the rear end of the machine, while if the nail is held pendent with its shank inclined to the right, as shown in Fig. 15, it will when dropped through the passage 106 pass through the oppositely-twisted branch 104 and be turned axially a quarter-revolution to the right, which will also cause it to be delivered with the straight flat side or back facing to the rear, as in the case of the nail passing through the branch 103, and in this manner every nail passing through the machine is delivered with absolute certainty with the same side facing to the front, as is necessary where nails are to be delivered to other machinery for subsequently operating upon or finishing the same.

If it should be desired to deliver the nail with its straight flat side facing to the front, it is merely necessary to remove the lower portion a' of the conduit Q and replace it with its branches 103 104 reversed to bring them in line, respectively, with the passages 106 105, which will produce the desired result. Furthermore, by making the lower portion of the conduit removable it may be easily cleared if it should from any cause become obstructed.

What I claim as my invention, and desire to secure by Letters Patent, is—

1. A horseshoe-nail-feeding machine, comprising a raceway for supporting nails or nail-blanks in line, means for automatically supplying nails thereto, an upright conductor, a carrier for conveying the nails one by one from the raceway to the conductor and dropping them therein, point foremost, means located beneath the conductor for catching the nail by the head and holding it in a pendent position with its shank inclined to the right or left hand side and subsequently releasing it, and a delivery-conduit arranged beneath the nail catching and holding device and provided with two separate passages, one for receiving the nail when its shank is inclined to the right, and the other when its shank is inclined to the left, said passages being twisted a quarter-revolution respectively in opposite directions, whereby a nail passing through either passage will be delivered with a predetermined side always facing in the same direction, substantially as set forth.

2. In a horseshoe-nail-feeding machine, the combination of a raceway for supporting pendent nails or nail-blanks in line, an upright conductor, a carrier for conveying the nails one by one from the raceway to said conductor and dropping them point foremost within the same, mechanism located beneath the conductor for catching the nail and holding it suspended by the head with its shank inclined to one side and subsequently releasing it, and a delivery-conduit arranged beneath the nail catching and holding device, and provided with two separate passages or branches, one to receive the nail when the shank is inclined to the right, and the other when it is inclined to the left, and said passages or branches being twisted a quarter-revolution respectively in opposite directions, whereby the nails are caused to be delivered from said conduit with a predetermined side always facing in the same direction, substantially as set forth.

3. In a horseshoe-nail-feeding machine, the combination of a raceway for supporting pendent nails or nail-blanks in line, a guideway for receiving and holding each nail as it leaves the foot of the raceway, a movable stop for holding back the line of nails in the raceway, an upright conductor, a carrier for conveying the nails one by one from the raceway to said conductor and dropping them point foremost within the same, mechanism located beneath the conductor for catching the nail and holding it suspended by the head with its shank inclined to one side and subsequently releasing it, and a delivery-conduit arranged beneath the nail catching and holding device and provided with two separate passages or branches, one to receive the nail when the shank is inclined to the right, and the other when it is inclined to the left, and said passages or branches being twisted a quarter-revolution respectively in opposite directions, whereby the nails are caused to be delivered from said conduit with a predetermined side always facing in the same direction, substantially as set forth.

4. In a horseshoe-nail-feeding machine, the combination of a raceway composed of a pair of rotative rollers for supporting pendent nails or nail-blanks in line, a pair of parallel guide-bars at the foot of said raceway for receiving and holding the nail as it leaves the same, a movable stop for holding back the line of nails in the raceway, a vertical conductor, reciprocating grippers for conveying the nails one by one from the raceway to said conductor and dropping them within the same, a pair of slides or dies located beneath the conductor for catching the nail and holding it suspended by the head with its shank inclined to the right or left according to its axial position when seized by the grippers, and a delivery-conduit located beneath the slides or dies and provided with two separate passages or branches, one to receive the nail when its shank is inclined to the right and the other when it is inclined to the left, and said passages or branches being twisted a quarter-revolution respectively in opposite directions, whereby the nail is caused to be delivered from said conduit with a predetermined side always facing in the same direction, substantially as described.

5. In a horseshoe-nail-feeding machine, the combination with the nail-supporting raceway and a reciprocating nail-carrier, of the upright conductor having one side open for the entrance of the shank of the nail while held in a pendent position by the carrier, said open side being provided with doors, and means for automatically opening said doors to admit the shank of the nail and closing the same after said shank has passed within the conductor, substantially as set forth.

6. In a horseshoe-nail-feeding machine, the combination with the nail-supporting raceway, of the guideway at the foot of the raceway for holding the nail in a pendent position, the movable stop-finger for holding back the line of nails in the raceway, the grippers mounted on a reciprocating slide and means for actuating the same, the reciprocating wedge and the springs for opening and closing said grippers, the upright conductor having an open side provided with doors, and means for opening said doors to admit the shank of the nail and closing the same after said shank has been placed within the conductor by the carrier, substantially as set forth.

7. In a horseshoe-nail-feeding machine, the combination with an upright conductor and mechanism for conveying the nails one by one thereto and dropping them therein, point foremost, of means for catching the nail by the head and holding it in a pendent position with its shank inclined to the right or left hand side according to its axial position when dropped within the conductor, substantially as described.

8. In a horseshoe-nail-feeding machine, the combination with the upright conductor, and mechanism for conveying the nails one by one thereto and dropping them therein, of the reciprocating slides or dies for catching and holding the nail when dropped within the conductor, said dies having their opposing faces shaped to hold the nail by the head in a pendent position with its shank inclined to the right or left hand side according to its axial position when received by the dies, substantially as described.

9. In a horseshoe-nail-feeding machine, the nail-delivering device consisting of a conduit having two separate passages united at their upper ends, thence diverging downward and again brought together at their lower ends where they unite in a single oblong delivery-outlet, said passages being twisted a quarter-revolution respectively in opposite directions, and the vertically-sliding partition arranged in the upper part of the conduit, substantially as and for the purpose set forth.

10. In a horseshoe-nail-feeding machine, the combination with an upright conductor and means for automatically dropping the nails one by one point foremost therein, of a device for catching the nail by the head and holding it in a pendent position with its shank inclined to the right or left hand side and subsequently releasing said nail, and a delivery-conduit arranged beneath the nail catching and holding device and having two separate passages, one for receiving the nail when its shank is inclined to the right and the other when its shank is inclined to the left, said passages being twisted a quarter-revolution respectively in opposite directions, whereby a nail passing through either passage will be delivered with a predetermined side always facing in the same direction, substantially as set forth.

11. In a horseshoe-nail-feeding machine, the combination with the nail-conductor and means for delivering the nail thereto and dropping it therein, of the reciprocating nail-grasping dies or slides coupled together to move simultaneously in opposite directions by means of a lever and connecting-rod, means for actuating said lever, a spring for closing the slides, and a stop to limit their inward movement to regulate the width of the space between their faces for receiving the nail, substantially as described.

12. In a horseshoe-nail-feeding machine, the combination with the raceway for supporting the nails or nail-blanks in line in a pendent position, of a straightening device consisting of a hammer and anvil located beneath said raceway and adapted to act upon the shanks of the nails as they pass through the raceway, and means for actuating the hammer, substantially as described.

13. In a horseshoe-nail-feeding machine, the combination with the upright conductor P, and the reciprocating slides or dies for catching and holding the nail, of the vertically-reciprocating clearer $t$, located within the conductor, and means for actuating the same to cause it to descend to the bottom of the conductor, remain at rest, and then pass down between the dies, substantially as set forth.

14. In a horseshoe-nail-feeding machine, the combination with means for catching and holding the nail by its head in a pendent position with its shank inclined to the right or left hand side, of a delivery-conduit provided with two separate passages, one to receive the nail when the shank is inclined to the right, and the other when it is inclined to the left, and said passages being twisted a quarter-revolution respectively in opposite directions, whereby the nail is caused to be delivered from said conduit with a predetermined side always facing in the same direction, substantially as described.

15. In a horseshoe-nail-feeding machine, the combination with means for catching the nail and holding it in a pendent position with its shank inclined to the right or left hand side, of a delivery-conduit provided with two separate passages twisted a quarter-revolution respectively in opposite directions, a movable partition adapted to pass to the right or left side of the shank of the nail according to its position and thereby guide the nail and cause it to pass with absolute certainty through its proper passage or branch to the outlet end of the conduit, substantially as set forth.

16. In a horseshoe-nail-feeding machine, the combination with means for catching the nail and holding it in a pendent position with its shank inclined to the right or left hand side, of a delivery-conduit provided with two separate passages twisted a quarter-revolution respectively in opposite directions, a vertically-sliding wedge-shaped partition arranged centrally within the upper portion of the conduit and lying normally beneath the point of the nail when suspended within the conduit, and adapted when raised to pass to the right or left side of the shank of the nail according to its position and thereby guide the nail and cause it to pass with absolute certainty through its proper passage or branch to the outlet end of the conduit, substantially as set forth.

17. In a horseshoe-nail-feeding machine, the combination with the nail-delivering conduit having two separate passages or branches twisted a quarter-revolution respectively in opposite directions and provided near its upper end with two spring-partitions 108, of a reciprocating wedge-shaped slide arranged between said spring-partitions and adapted to separate the same in its ascent, and means for actuating said slide, substantially as set forth.

18. In a horseshoe-nail-feeding machine, the nail-delivering conduit composed of an upper portion having two separate passages and a lower detachable portion having corresponding coinciding passages twisted a quarter-revolution respectively in opposite directions, said detachable portion being reversible or interchangeable to reverse the axial movement of the nail in its passage to the outlet end of the conduit, substantially as set forth.

19. In a horseshoe-nail-feeding machine, the nail-delivery conduit composed of an upper portion having two separate passages and provided with spring-partitions, and a reciprocating wedge-shaped slide arranged between said spring-partitions, and having shoulders near its lower end to receive the ends of the same, and a detachable lower portion connected with the upper portion of the conduit by suitable fastenings, and having passages coinciding with the passages of the upper portion and twisted a quarter-revolution respectively in opposite directions, substantially as described.

20. In a horseshoe-nail-feeding machine, the combination with the raceway for supporting pendent nails or nail-blanks in line, of the hopper B, the rotating cylinder C, connected therewith and provided with adjustable outlet-openings, the chutes 25, and H, and the endless belt 26, provided with elevator-buckets for catching and returning the nails to the hopper B, all constructed to operate substantially as described.

Witness my hand this 5th day of May, A. D. 1896.

WILLIAM P. WHITMARSH.

In presence of—
P. E. TESCHEMACHER,
B. L. MARDEN.